March 1, 1966

P. E. SMITH, JR 3,238,435

POSITIONING DEVICE

Filed June 19, 1962

INVENTOR.
PAUL E. SMITH JR
BY
Ezekiel Wolf, Wolf & Greenfield
ATTORNEYS

March 1, 1966   P. E. SMITH, JR   3,238,435
POSITIONING DEVICE

Filed June 19, 1962   2 Sheets-Sheet 2

INVENTOR.
PAUL E. SMITH JR
BY
Ezekiel Wolf, Wolf + Greenfield
ATTORNEYS

United States Patent Office 3,238,435
Patented Mar. 1, 1966

3,238,435
POSITIONING DEVICE
Paul E. Smith, Jr., Littleton, Mass., assignor, by mesne assignments, to Gustav F. Machlup, Cambridge, Mass.
Filed June 19, 1962, Ser. No. 203,529
4 Claims. (Cl. 318—369)

The present invention relates to positioning devices and more particularly comprises an improvement over the positioning device disclosed in United States Patent No. 2,948,839 issued on August 9, 1960 to Paul E. Smith, Jr. and Hans A. Dudler.

Positioning devices of the type disclosed herein and in the patent identified above of which I am coinventor are capable of positioning a variety of devices such as valves, guide bars, rods, cutting edges, potentiometers, resolvers, etc. These positioning devices are also suitable for use in mechanisms which make analog digital data conversions and are further useful in controlling the various moving parts of automatic machine tools. Generally, positioning devices of the type disclosed herein may be used in any system where translational motion is to be controlled by a rotational input.

One important object of this invention is to provide a positioning device having a simplified assembly of parts and a resulting increase in accuracy, dependability and serviceability.

Another important object of this invention is to provide a positioning device having a simplified safety control system.

Another important object of this invention is to provide a positioning device which upon power failure automatically releasably locks the controlled member in the position assumed by the member at the time of the failure.

Still another important object of this invention is to provide an automatic positioning device which may be operated manually to override the automatic input when desired as well as to provide control upon power failure or other failure of the automatic input.

Another important object of this invention is to decrease the dynamic load imposed upon the input of a positioning device.

A further object of this invention is to prevent contaminants from reaching the interior of the control device.

To accomplish these and other objects the positioning device of this invention includes a ball lead screw and nut disposed within a case which supports the nut for rotational motion and yieldably restrains it from axial motion. The lead screw is permitted to move axially but is restrained from moving rotationally within the frame. The lead screw may be connected through a push rod to the controlled member so that the position of the controlled member may be regulated. A gear surrounds and is connected to the nut and that gear in turn is connected through a gear train to a prime mover. A pair of switches are disposed adjacent one side of the gear and are serially connected in the energizing circuit of the prime mover. The yieldable restraint exerted on the nut against axial movement is overcome by the thrust applied to the nut by the lead screw when axial movement of that screw is obstructed. The switches disposed adjacent the side of the gear are adjusted so that axial movement of the gear exceeding a preselected limit will actuate the appropriate switch to open the prime mover energizing circuit.

These and other objects and features of this invention along with its incident advantages will be better understood and appreciated from the following detailed description of one embodiment thereof, selected for purposes of illustration and shown in the accompanying drawing, in which.

Figure 1:
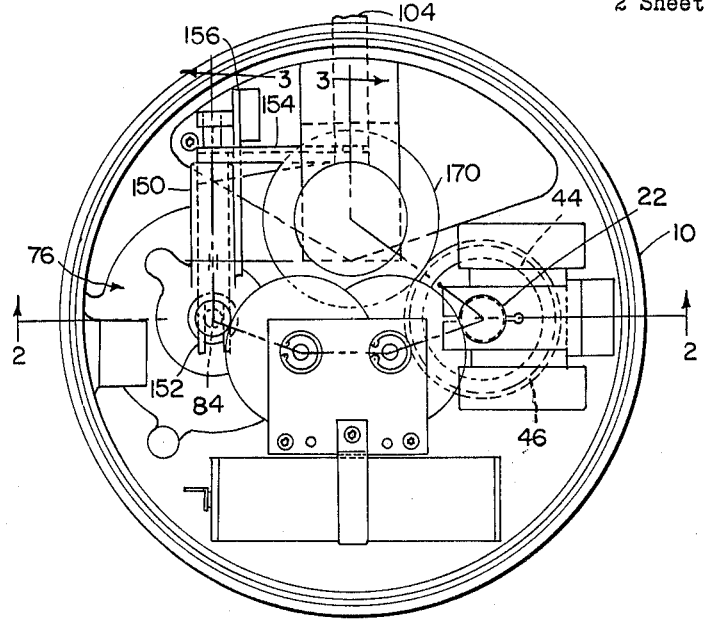
FIG. 1 is a top view, with the cover removed, of a positioning device constructed in accordance with this invention.

The embodiment of this invention shown in the drawing is contained within a cylindrical case 10 having an internally threaded upper end 12 to which is secured a cover 14. Disposed within the case and cover is a nut and lead screw assembly 16, a servo motor 18 and a gear train 20 (see FIG. 3).

The lead screw and nut assembly 16 preferably is provided with ball bearing connections to reduce friction and increase their operating efficiency. Such assemblies are commonly termed "ball nut and lead screw." Specifically, the assembly includes a nut 22 and a screw 24. The lower end 26 of the lead screw 24 is keyed by a pin 28 to a push rod 30 which in turn is adapted to be connected to the member controlled by the positioning device. A threaded section 32 at the lower end of the push rod is conveniently provided to make the connection between the rod and the controlled member.

The lead screw 24 is constrained against rotational movement by virtue of being keyed to the push rod 30 which in turn is connected to the controlled member. Typically, the controlled member may be a valve stem which is prevented from rotating by the valve mounting in the valve housing. The push rod 30 slidably extends through a bushing 34 in cap 36, and the cap defines a chamber 38 in the case 10 for housing some of the parts of the ball nut and lead screw assembly 16. A housing 40 is suggested in FIG. 2 at the bottom of the bushing 34 and is merely representative of the housing which may contain the controlled member. A pin 42 extends through the push rod 30 and serves as a stop to limit the upward travel of the push rod and consequently the upward travel of the lead screw 24, to the position shown in FIG. 2.

The nut 22 is fixed to a cup-shaped gear 44 provided with gear teeth 46 on its outer cylindrical surface. The cup-shaped gear 44 has a depending skirt 48 which in turn carries the inner ring 50 of the ball bearing assembly 52. The outer sleeve 54 of the ball bearing assembly in turn is secured to a cylinder 56 having an outwardly extending flange 58. The outer surface 60 of the flange 58 slidably engages the inner cylindrical surface of rings 62 anchored in the wall of the chamber 38.

The cylinder 56 defines with the inner surface of the chamber 38 an annular housing 64 divided into upper and lower sections 66 and 68 by the flange 58. Two pairs of preloaded spring washers 70 are disposed in the upper annular housing section 66 and two additional pairs of spring washers 72 are disposed in the lower section 68. These preloaded spring washers yieldably restrain movement of the cylinder 56 axially in either an upward or downward direction as viewed in FIG. 2, and only by overcoming the loads impressed on the flange 58 may it be moved in either direction. Thus, as the skirt 48 of gear 44 is coupled to the cylinder 56 through the bearing assembly 52, yieldable axial restraint is exerted upon the cup-shaped gear 44, and by virtue of the fixed relationship between the nut 22 and the cup-shaped gear, the nut 22 is similarly constrained against axial motion. However, the bearing assembly 52 permits the cup-shaped gear 44 to rotate freely within upper chamber 74 of the case.

From the foregoing description it will be recognized that when rotation is imparted to the cup-shaped gear 44, the nut 22 will also rotate, and as the lead screw 24 cannot rotate, it will move axially through the ball nut. The axial direction in which the lead screw 24 moves is of course determined by the direction of rotation of the gear 44. As viewed in FIGS. 1 and 2, when the cup-shaped gear 44 is rotated counter-clockwise, the lead screw 24 will move in a downward direction, and clockwise rotation of the gear 44 will move the lead screw 24 upwardly in the case 10. Because the cup-shaped gear 44 is only yieldably biased to a fixed axial position, restraint applied to the lead screw 24 preventing it from moving axially (for example, by the control member reaching the limit of its movement) upon further rotation of the cup-shaped nut 44 exerts a thrust upon the nut resulting in axial motion of the cup-shaped gear against the yieldable restraint imposed upon it by the preloaded spring washers 70 or 72.

As indicated above, two separate inputs are provided for imparting rotation to the cup-shaped gear 44; namely, an automatic input in the form of a prime mover 18 and gear train 20, and a manual input 70' which includes a hand wheel 72' and a gear assembly 74. The prime mover 18 includes a bi-directional servo motor 76 having a stator 78 and an axially displaceable rotor 80. The rotor 80 is mounted on motor shaft 82 having a torsion rod 84 secured to its upper end. The torsion rod 84 carries a pinion 86 that drives driven gear 88 mounted on a second torsion rod 90 supported at its ends in bearings 92. Thus, driven gear 88 in turn rotates rod 90 and its pinion 94. Pinion 94 in turn drives a second gear 96 mounted on a shaft 98 also supported at its ends in bearings 100. Another pinion 102 is carried on the shaft 98 and it in turn drives the cup-shaped gear 44 fixed to the ball nut 24 and forming part of the positioning assembly. The use of torsion rods 84 and 90 in the gear train 20 between the motor and the cup-shaped gear 44 decreases significantly the dynamic load imposed upon the motor. The torsion rods permit some twisting which absorbs the shock imposed during sudden stopping and starting of the motor or movement of the lead screw 24.

In the manual control 70', the hand wheel 72' is mounted on a two position shaft 104 yieldably keyed in each position by the detent 106 and two parallel annular recesses 108 and 110. Each of the recesses is adapted to receive the ball 112 loaded by the spring 114 forming part of the detent assembly. The inner end of shaft 104 carries a bevelled gear 116 which mates with a second bevelled gear 118 on a shaft 120 supported on the plates 122 of the frame. The shaft 120 also carries gear 124 which registers with the cup-shaped gear 44 secured to the nut 22.

Figure 3:
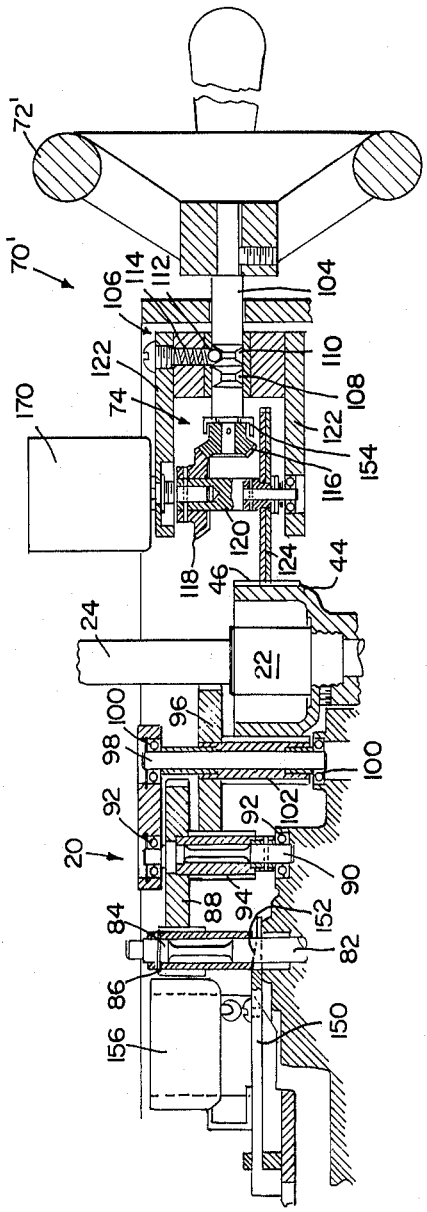
FIG. 3 is a fragmentary cross sectional view taken along the corresponding section line in FIG. 1.

As stated, the shaft 104 is held in either of its selected positions by the detent assembly 106. In FIG. 3, the shaft 104 is shown in its operative position wherein the ball 112 of the detent fits in the recess 110 on the shaft. In this position the bevelled gear 116 registers with the gear 118 on shaft 120 so that rotation of the hand wheel 72' imparts rotation to the cup-shaped gear 44. When the hand wheel 72' is not being operated it is pulled toward the operator (to the right as shown in FIG. 3) so that the ball 112 moves out of recess 110 and into recess 108 on the shaft 104. In that position the load of the hand wheel 72', its shaft and the gears 116 and 118 are not imposed upon the automatic input when it rotates the cup-shaped gear 44.

Figure 2:
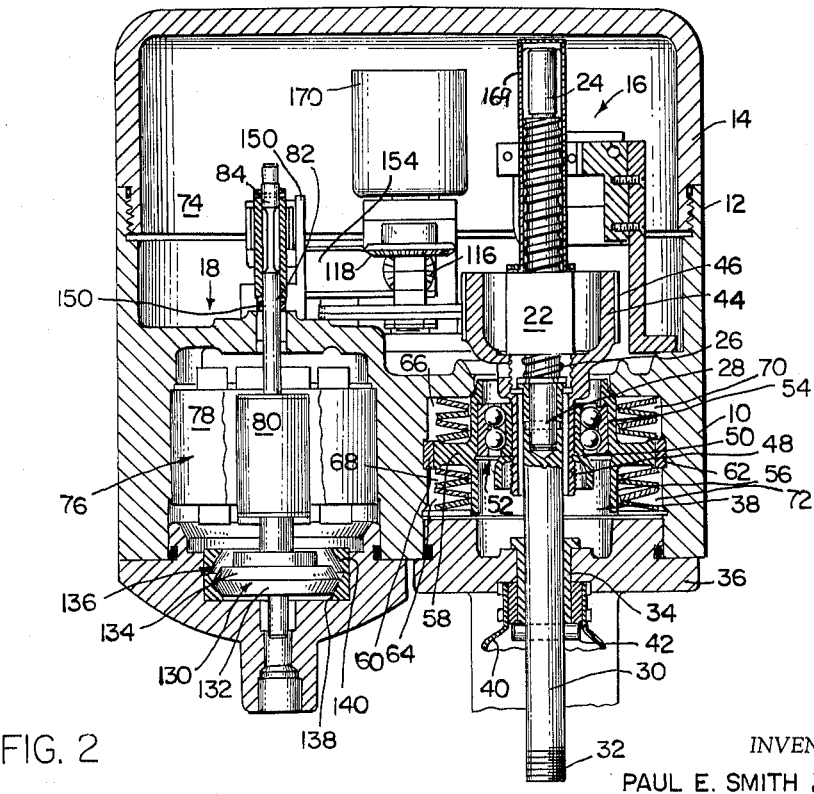
FIG. 2 is a cross sectional view taken along the corresponding section line in FIG. 1.

In FIG. 2, the rotor 80 of the servo motor 76 is shown to be secured at its lower end to brake wheel 130 having two beveled faces 132 and 134. The brake wheel 130 is shown disposed in a brake shoe 136 also provided with a pair of beveled faces 138 and 140. In FIG. 2 the face 132 of the wheel 130 is shown in contact with face 138 of the shoe 136 and thus a load is applied to the rotor that prevents it from rotating. However, when the servo motor 76 is energized the field established in its stator 78 attracts the brake wheel 130 and lifts it to a neutral position wherein each of the bevelled faces of the wheel 130 are spaced from the bevelled faces of the shoe. Thus, when the motor is energized the brake imposes no load upon the servo motor and its rotor 80 may turn and through the gear train rotate the cup-shaped gear 44. However, when the motor 76 is deenergized for any reason the magnetic field which supported the break wheel 130 is discontinued and the brake wheel engages the shoe to retain the cup 44 in the angular position which it occupied at the time the motor was deenergized. This action in turn supports the lead screw 24 in its axial position at the time of motor deenergization.

The manual input 70' is normally used for either one of two purposes; namely, to override the automatic input or to be used in place of the automatic input when power failure occurs. In order to reduce the load on the hand wheel 72' when manual operation is desired and particularly to disengage the motor brake which would otherwise act directly against the manual input, a lift fork 150 having a bevelled surface 152 engages the motor shaft 82 to raise the rotor 80 and thus the brake wheel 130 when the shaft 104 is moved to the operative position shown in FIG. 3. When the shaft is in its withdrawn (inoperative) position, the lift fork 150 does not disturb the position of the motor shaft 82 and the brake wheel 130 remains seated on the brake shoe. The lift fork 150 as shown in FIG. 1 is carried on an arm 154 secured to the shaft 104. Thus, when the shaft 104 moves inwardly to the active or operative position the lift fork 150 moves with it and, the bevelled surface 152 acts as a wedge upon the shaft 82 to raise it from the position shown in FIG. 2. Withdrawal of the shaft 104 of course has the opposite effect; that is, the fork is withdrawn by the movement of the arm 154 on the shaft 104.

In FIGS. 1 and 3 a microswitch 156 is shown disposed adjacent the lift fork 150 and the microswitch 156 is disposed in the circuit for energizing the servo motor 76. The microswitch 156 is normally closed but it is opened upon actuation of the lift fork 150 to the forward position, indicating that the hand or manual input has taken over for the automatic input. Thus, simultaneously with the actuation of the lift fork 150 to its operative position, the servo motor 76 is deenergized. It will be recognized that deenergization of the servo motor 76 ordinarily causes the brake wheel 132 to engage the brake shoe, but the lift fork 150 prevents this from happening and rather makes it possible to rotate the cup-shaped gear 44 through the manual input.

Figure 4:
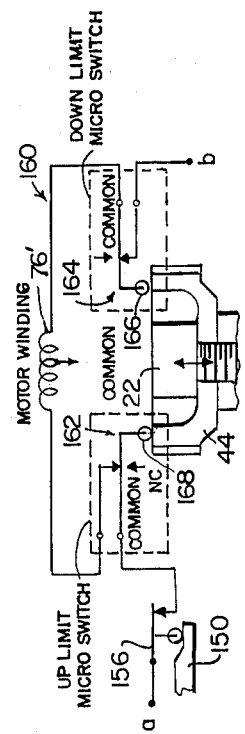
FIG. 4 is a diagrammatic view of a portion of the positioning device with a schematic diagram of the safety control circuit.

In FIG. 4 a portion of the motor control circuit 160 is illustrated. It will be noted that the circuit of motor winding 76' is connected to a pair of leads "a" and "b" through microswitches 162 and 164 respectively providing the up limit and the down limit of travel of the ball nut 22. Also in the circuit is the normally closed microswitch 156 described above. The microswitches 162 and 164 are each shown to be positioned adjacent the upper or open side of the cup-shaped gear 44 secured to the nut 22. Each of the two microswitches is normally closed, that is, each normally places the motor winding 76' actively across the leads "a" and "b" so that the motor may be energized from an exterior source upon demand. When the lead screw 24 is restricted from further downward movement as viewed in FIG. 2 (typically when the controlled member reaches the end of its allowed stroke or an obstruction impedes further movement of the lead screw), the cup-shaped gear with the nut 22 moves upwardly on the lead screw (relative motion between the lead screw and the nut continue in the same direction). The gear 44 engages the blade 166 of the microswitch 164 to open the contact and thus break the circuit for the motor winding. The microswitch 164 may be adjusted to limit the travel of the cup-shaped gear and nut 22 to a preselected distance before actuation of the switch occurs. This adjustment as well as the adjustment made upon the microswitch 162 will of course be determined by the particular application of the positioning device.

The microswitch 162 which serves as the up limit for the lead screw is adapted to open the circuit of the motor winding after the lead screw is prevented from traveling further in an upwardly direction as viewed in FIG. 2. The blade 168 of the microswitch 162 is preloaded so as to remain closed so long as the cup-shaped gear remains above some preselected height. Thus, when upward movement of the lead screw is impeded and the nut 22 and the cup-shaped gear 44 move downwardly in the case 10 against the load imposed upon the cup-shaped gear by the spring washers 72, the microswitch 162 opens and causes deenergization of the motor winding. The position of each of the microswitches 162 and 164 on the same side of the cup-shaped gear facilitates adjustment, replacement and assembly of the entire system, and constitutes an advantage over devices wherein the limit switches are on opposite sides of the gear.

In FIG. 2 it will be noted that a hood 169 extends over and encloses the lead screw 24. The hood is secured at its bottom to the top of the nut 22 and prevents any contaminants from interfering with the proper operation of the lead screw and nut assembly.

In the foregoing description no mention has been made of the type of signal which may be supplied to the servo motor to control actuation of the lead screw to in turn position the controlled member. The servo motor may well be controlled by the circuit disclosed in Patent Nos. 2,948,839 and 2,948,295. In the case 10, however, certain of the components used in the control circuits to supply a variable signal to the motor 76 are shown. For example, a feed back potentiometer 170 is shown in FIGS. 2 and 3, keyed to the shaft 120 connected by means of gear 124 to the cup-shaped gear 44. Thus, the potentiometer 170 is connected in the input of the cup-shaped gear 44 so that it will constantly render a signal indicative of the angular position of the cup-shaped gear 44. It will be recognized that operation of the potentiometer 170 is not limited to one or the other of the two inputs provided, but rather the potentiometer senses operation or rotation of the gear 44 resulting from either input.

In connection with the brake shoe 136 and wheel 130, it will be recognized that because each is provided with a pair of beveled faces and movement of the wheel in either direction from a central position within the shoe causes engagement of the brake, the assembly is operable in substantially any position. Thus, the positioning device of this invention need not be oriented in the vertical position shown in FIG. 2, but rather can assume substantially any other position and function with equal dependability.

Having described the details of the several parts of this invention those skilled in the art will appreciate that numerous modifications may be made of the several parts without departing from the spirit of this invention. Therefore, it is not intended that the breadth of this invention be determined by the single embodiment illustrated and described. Rather, it is intended that the breadth of this invention be determined by the appended claims and their equivalents.

What is claimed is:
1. A positioning device comprising
a prime mover,
a nut rotatable in either direction in response to operation of the prime mover,
a lead screw threaded within the nut,
means yieldably restraining axial movement of the nut causing rotation of the nut to axially move the lead screw, said restraining means enabling said nut to move axially on the lead screw when axially movement of the lead screw is restrained, whereby relative movement of the nut and lead screw continues in the same direction with continued rotation of the nut when movement of the lead screw is restrained,
a pair of switches disposed on the same side of the nut and responsive to axial movement of the nut beyond preselected limits in either direction, and a circuit including the switches and prime mover for discontinuing operation of the prime mover when either switch is actuated,
and a plurality of torsion bars interconnecting said prime mover and said nut for absorbing some of the dynamic load imposed on the prime mover.

2. A positioning device comprising
a lead screw and nut assembly,
a housing for the assembly,
a motor operatively connected to the nut for rotating the nut to axially move the lead screw,
means including a brake secured to the motor shaft for holding the shaft and the nut in the position assumed by those parts when the motor is deenergized,
means including a handle operatively connected to the nut for manually rotating the nut to axially move the screw,
means operatively connected to the brake and the handle for releasing the brake upon actuation of the handle,
and additional means operatively connected to the handle and the motor for deenergizing the motor when the handle is actuated.

3. A positioning device as defined in claim 2 further characterized by means including at least one torsion rod interconnecting the motor and the nut for absorbing some of the dynamic load imposed on said motor.

4. A positioning device comprising
a housing containing a lead screw and nut assembly,
means restraining rotational movement of the screw and enabling rotational movement of the nut,
spring means operatively connected to the nut for yieldably restraining axial movement of the nut,
a motor connected through a torsion bar and gear train to the nut for imparting rotation to the nut to move the lead screw axially in a direction determined by the direction of rotation of the nut,
a brake wheel secured to the motor and surrounded by a brake shoe and biased to a position wherein the wheel engages the shoe and prevents rotation of the nut,
a magnetic field established by energization of the motor for removing the wheel from the shoe enabling the motor to rotate the nut,
a handle connected through a shaft and gear means for rotating the nut,
said shaft being movable between operative and inoperative positions wherein the gear means are engaged and disengaged respectively,
means connected to the shaft and operatively connected to the brake wheel for removing the wheel from the shoe when the shaft is moved to its operative position, a circuit for energizing the motor, a switch in the circuit and opened in response to movement of the shaft to its operative position to disable the energizing circut of the motor, and a pair of additional switches in the motor circuit and each disposed on the same side of the nut, one of said additional switches disabling said energizing circuit when the nut moves axially a preselected distance in one direction, and the other of said additional switches disabling the energizing circuit when the nut moves axially a preselected distance in the other direction.

References Cited by the Examiner
UNITED STATES PATENTS

| | | | |
|---|---|---|---|
| 2,407,537 | 9/1946 | Chapman | 318—469 X |
| 2,482,840 | 9/1949 | Collins | 318—372 |
| 2,945,925 | 7/1960 | Gessell | 318—475 X |
| 2,994,756 | 8/1961 | Gessell | 318—475 X |
| 3,059,485 | 10/1962 | Bohlman et al. | 318—469 X |

FOREIGN PATENTS

| | | |
|---|---|---|
| 807,182 | 1/1959 | Great Britain. |

ORIS L. RADER, *Primary Examiner*.